Figure 1:
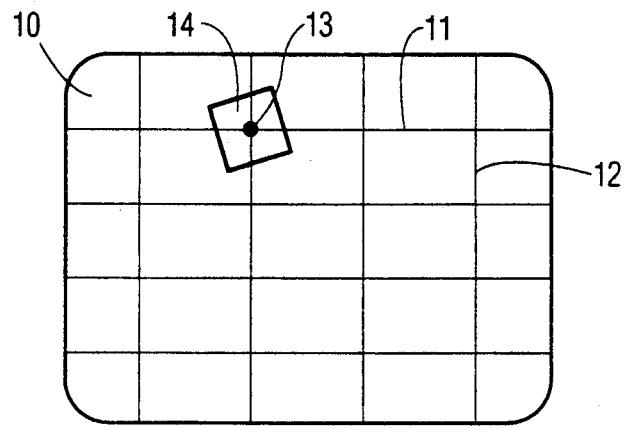

United States Patent [19]
Gleim et al.

[11] Patent Number: 5,282,033
[45] Date of Patent: Jan. 25, 1994

[54] METHOD AND DEVICE FOR RASTER CORRECTION

[75] Inventors: Günter Gleim; Vincent Humeau, both of Villingen, Fed. Rep. of Germany

[73] Assignee: Deutsche Thomson-Brandt GmbH, Villingen, Fed. Rep. of Germany

[21] Appl. No.: 975,227

[22] Filed: Nov. 12, 1992

[30] Foreign Application Priority Data

Nov. 12, 1991 [DE] Fed. Rep. of Germany ....... 4137131

[51] Int. Cl.$^5$ .............................................. H04N 9/62
[52] U.S. Cl. ...................................... 358/139; 358/10
[58] Field of Search .................. 358/69, 10, 65, 139; 445/3, 63; H04N 17/00, 17/02, 17/04

[56] References Cited

U.S. PATENT DOCUMENTS 4,925,420  5/1990  Fourche et al. ...................... 358/10

FOREIGN PATENT DOCUMENTS

| 0049123 | 4/1982 | European Pat. Off. ....... H04N 5/13 |
| 0104231 | 8/1979 | Japan .............................. H04N 9/62 |
| 0009887 | 1/1980 | Japan .............................. H04N 9/28 |
| 2102258 | 1/1983 | United Kingdom . |

OTHER PUBLICATIONS

Patent Abstract of Japan vol. 13, No. 16 (E-230) Sep. 14, 1988 JP 62-221787.
Patent Abstract of Japan vol. 9, No. 99 (E-311) Dec. 17, 1984 JP 59-224980.

*Primary Examiner*—Victor R. Kostak
*Assistant Examiner*—Nathan J. Flynn
*Attorney, Agent, or Firm*—Joseph S. Tripoli; Joseph J. Laks; Daniel E. Sragow

[57] ABSTRACT

A method of correcting position errors of points in a television picture formed from a plurality of individual pictures includes the steps of arranging a pattern of photosensors in the proximity of the television picture. The pattern of photosensors is sequentially illuminated with the individual pictures. The positions of the most brilliantly illuminated sensors for each individual picture are noted and correction values for each of the individual pictures are generated in accordance with the position of the most brilliantly illuminated sensors within the pattern. The correction values are stored and used to correct the positions points within the individual pictures.

4 Claims, 1 Drawing Sheet

METHOD AND DEVICE FOR RASTER CORRECTION

This invention is directed to a method and device for correcting the raster in a television apparatus. Television apparatus in this case is understood to be any apparatus with screen (raster)-type electronic picture reproduction. The apparatus can be fed with a television broadcast signal or a video signal from another video source, such as a recorder, camera or other video line. The control of the apparatus can be carried out via an antenna signal or, in the form of a monitor, via a CVBS signal, an RGB signal or also separately with the luminance signal and the color subcarrier.

A system for screen correction basically serves for the correction of parameters in the screen deflection, for example, for correcting north/south or east/west distortions, non-linearity in the deflection and other geometrical errors in the horizontal or vertical direction. One particular field of application of such a device is the convergence correction in a television-projector device in which single pictures, such as the monochromatic pictures from three kinescopes, for example, are projected onto one picture area and made congruent there while maintaining the convergence.

With a known device for the convergence correction, always one crossing point of the grid pattern is marked by a cross-shaped cursor which can be moved horizontally and vertically. Then the convergence is adjusted manually to optimum values through optical observation and assessment of the convergence in the area of this crossing point. These values for this crossing point are stored in a memory. Upon picture reproduction, the stored convergence correction values for the individual crossing points successively effect the necessary convergence correction in that for each of the three kinescopes, convergence correction currents for the horizontal and vertical convergence, independent from the deflection currents, are fed to the deflection unit.

The setting of the convergence for all crossing points on the picture screen takes a relatively long time and is affected by subjective points of view.

A device for automatic screen correction is known from DE-OS 39 31 032, whereby said device comprises a large part with rows of photosensors which may be placed onto a picture area.

The function of the invention in the named disclosure document (OS) is based on the finding that optimum convergence means that the three beams for R, G, B coincide on the picture area at any point in time. Consequently, with an adjustment pattern presented by a television apparatus and formed, for example, from stripes running in various directions, a white pattern is mapped out at a corresponding amplitude ratio of the color signals. On the other hand, the coincidence of the three beams for R, G, B means maximum brightness for the stripes projected because the brightness values of the primary colors R, G, B are accumulative.

As soon as one of the beams R, G, B leaves the area of the pattern owing to faulty convergence, not only the reproduced color deviates from white but the brightness of the pattern is also reduced.

Therefore, a convergence correction according to the named disclosure document (OS) is carried out in that using the sensors, the geometrical arrangement of which is essentially congruent with adjustment patterns which are presented by a television apparatus for the screen correction, the brightness of a part of this pattern, such as a stripe, is measured and set to the maximum value through altering the convergence.

It is the task of the present invention to introduce a method and a device suitable for executing this method which permit an automatic screen correction with the aid of photosensors without the geometrical arrangement of photosensors, also called light sensors, having to be congruent with adjustment patterns which are presented by a television apparatus for the screen correction.

According to the invention, upon fading-in (superimposing) single or several adjustment patterns belonging to individual pictures, the position of illuminated sensors is evaluated in such a way that a convergence correction is performed through iterative and/or mathematical techniques.

Normally, the crossing points of grid lines serve as an adjustment pattern for the convergence correction. Although the invention will be illustrated essentially by means of such crossing points in the following, it is not restricted to such adjustment patterns.

These considerations for the convergence are valid in the same way for other parameters of the screen deflection. The electron beam also deviates from the prescribed course in the case of other geometrical errors. Then the brightness measured by the sensors is also reduced, while with an exact target position for the screen written, the total brightness measured by means of the sensors, and hence the summation voltage output, is at a maximum. Thus, the device can be used to determine and correct deflection errors in the most general sense, i.e. deviations of the beam from the prescribed course.

With advantageous further development of the invention, a large part is provided with the dimensions of the entire picture area which is hung in front of the picture area like a mesh. Arranged on this part are a multiplicity of pairs, corresponding to the number of crossing points of the lattice design, and made of two rows of sensors. Successively, the individual pairs of rows of sensors are called up, the convergence correction values for the crossing points are determined and stored.

In this way an automatic convergence correction can be carried out in a short time for the entire picture screen. This is particularly advantageous if, for example, the convergence needs to be readjusted more frequently owing to changes in positions or alterations in the surrounding magnetic field.

According to a further development of the invention, the screen correction can be regulated in fine steps or checked in that upon fading-in several or all adjustment patterns belonging to individual pictures the summation voltage is regulated to maximum amplitude.

Figure 2:
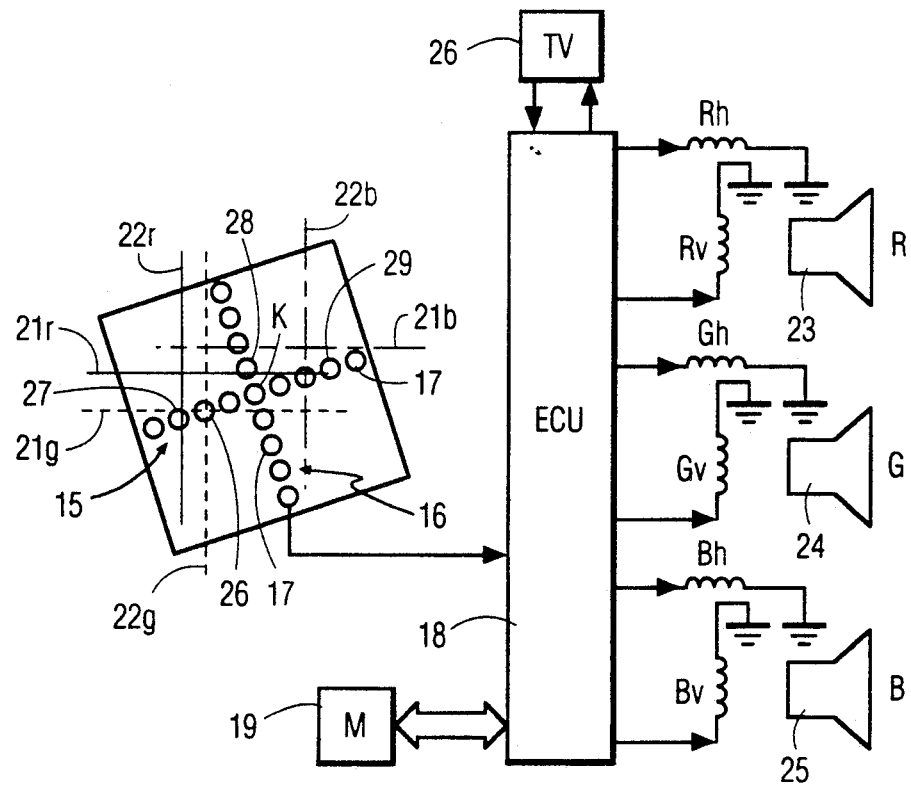

Further features, advantages and details are explained in the following embodiment examples by means of the drawing. Therein is shown:

FIG. 1 is a picture area with lattice design and a sensor element indicated symbolically; and FIG. 2 is a block circuit diagram of a first embodiment example.

FIG. 1 shows a picture area 10, mapped out by a television apparatus which is not illustrated, upon which picture area a lattice design consisting of horizontal white stripes 11 and vertical white stripes 12 is projected by three kinescopes for the primary colors R, G, B. The stripes 11, 12 have roughly the width of one line and form crossing points 13 for which respectively the convergence correction values are to be determined and stored. For adjusting the convergence for the crossing point 13, an element 14 containing photosensors, hereinafter also called sensor element, is laid or placed on the picture area 10, and in this embodiment example in such a way that two rows of sensors of light-sensitive elements disposed on the rear side of the sensor element 14 are not congruent with the desired position of the stripes 11, 12.

FIG. 2 shows, symbolically, the block circuit diagram of a preferred embodiment example.

While in FIG. 1 it is assumed that monochromatic grids for the three primary colors R, G, B were well-adjusted in relation to each other and, therefore, a grid with colorless stripes 11, 12 is mapped out by the television apparatus, in FIG. 2 the case of insufficient adjustment is shown so that colored stripes 21r, 21g, 21b appear in the horizontal direction and colored stripes 22r, 22g, 22b appear in the vertical direction.

None of these stripes 21, 22 is congruent with a first row of sensors 15, illustrated in FIG. 2 as skewed from bottom left to top right, nor with a second row of sensors 16 (skewed from top left to bottom right). In this embodiment example, the rows of sensors 15, 16 are perpendicular and are formed of similar sensors 17 to form the sensor element 14.

The signals from the sensors 17 are fed to an electronic control unit (ECU) 18 which, for example, can contain a computer, can be designed as a part of a computer program, and contains necessary means for signal transmission such as digital-to-analog converters, for example. A memory 19 is assigned to the control unit 18 and this supplies convergence correction currents which are fed respectively to correction coils for the horizontal convergence Rh, Gh, Bh and convergence coils for the vertical convergence Rv, Gv, Bv for three kinescopes 23, 24 25 for the primary colors R, G, B.

The coils illustrated are convergence coils in this embodiment example which are arranged on the kinescopes 23, 24, 25 independently from the actual deflection coils and have a considerably lower inductivity than the deflection coils (not illustrated) themselves.

Furthermore, the electronic control unit 18 is connected to means 26 of the television apparatus. From said means it receives information on the position and shape of the respective adjustment patterns. Apart from that, the control unit 18 can send control signals regarding the position and/or shape of the respective adjustment patterns to the means 26.

It is assumed that the uncorrected monochromatic grids 21, 22 are not tilted towards each other and that their directions correspond to the desired directions of the stripes 11, 12. However, the sensor element 14, and thus the rows of sensors 15, 16 too, is to be arranged at an angle in relation to the stripes 21, 22.

With a first variation of this embodiment example, the sensor K, which is located at crossing point of two rows of sensors 15 and 16 is arranged at one of the desired crossing points 13 for the corrected monochromatic stripes 11, 12.

Screen correction can be carried out such that the monochromatic grids are at first faded-in and corrected individually.

The electronic control unit 18, to which the sensor signals are fed, recognizes, according to the illustration in accordance with FIG. 2, with a superimposed green grid 21g, 22g that a sensor 26 is illuminated and measures such a high light intensity that the crossing point of the green grid 21g, 22g is identified by deduction.

Using iterative techniques, such as are known as such, the deflection of the green grid 21g, 22g is corrected such that its crossing point coincides with the desired crossing point K of the sensor cross 15, 16.

The corresponding correction values are stored in the memory 19 by the electronic control unit 18, and are called up upon picture reproduction and fed into the correction coils as appropriate correction currents.

In a next step, the green grid 21g, 22g is blanked out and the red grid 21r, 22r is faded-in. Thereby, sensors 27, 28, 29 are illuminated and corrected on the crossing point K through iterative techniques. Following this, the correction for the blue grid 21b, 22b is carried out in a similar fashion.

The blanking-out of a pattern already corrected is then only necessary if the positions of the illuminated sensors do not clearly allow the position of the grid to be corrected to be identified.

This depends, among other things, on the choice of geometrical arrangement for the sensors, the shape of the adjustment pattern which is formed here from the stripes 11, 12, and the selection of the desired crossing point 13.

The controlling of the shape of respective adjustment patterns, such as the fading in and out of parts already corrected, is carried out by the electronic control unit 18 and corresponding signals sent to the means 26.

Further variations of this embodiment example permit definition of the crossing point for one of the monochromatic grids 21, 22 as the desired crossing point 13, and correction of the other two grids by means of iteration.

The sensor element 14 can also be designed larger and can contain a multiplicity of pairs of rows of sensors 15, 16 which are then evaluated sequentially by the electronic control unit after the sensor element 14 has been placed. The sensor element 14 can have the size of the entire picture area 10 and corresponding rows of sensors 15, 16 for all crossing points 13 on the picture 10. Then the sensor element 14 only needs to be located in front of the picture area 10 once for adjusting the convergence for all crossing points.

To avoid determining unusable correction values it is advantageous if the correction procedure is first started when the sensor element 14 is positioned as desired. This may be triggered manually through means which are not illustrated and/or in a manner controlled by a time function element. It is also conceivable that instead or in addition, a constant illustration of individual sensors 17 is detected and thereupon, the desired positioning of the sensor element 14 is identified by deduction.

It is also sensible to appropriately signal, optically, acoustically or similarly, the completion of a correction procedure for a prescribed desired crossing point 13.

The completion, as well as a possible interruption, can, for example, be automatically recognized by means which are not illustrated, in a manner similar to the start determination.

Furthermore, it is conceivable that, owing to the coordinates of the illuminated sensors, to deductively identify the geometrical difference of grid 21, 22, crossing point 13 and sensor crossing point K and thereupon, to carry out a correction by means of mathematical techniques as rapidly as possible.

The tilt angle between the grid 21, 22 and the rows of sensors 15, 16 can be determined by technique known as such, and, if applicable, taken into account in the correction of the positioning.

For checking the individually corrected monochromatic grids 21, 22, several of them can be faded-in simultaneously and a fine correction can be carried out such that the illuminated sensors measure maximum brightness. This can, for example, be regulated by forming summation signals from individual sensor signals or, respectively, checked by comparison with preceding values or prescribed values.

In a further embodiment example, parts of adjustment patterns, such as vertical stripes 21, for example, of single or several primary colors are faded-in simultaneously. Using iterative and/or mathematical techniques, it is possible that at first these parts presented are guided into the desired position and subsequently the parts not presented at first, such as the horizontal stripes, are faded-in and adjusted. With the correction of the horizontal stripes, the vertical stripes already corrected can be, for example, blanked out in the case of lack of unambiguity.

The invention has been described for the convergence monitoring and correction. It is, in principle, applicable for checking the desired position of the deflection screen (raster) and for determining and storing the corresponding correction values for individual points of the picture area. The invention can be employed in a projector installation or in a conventional television apparatus having a kinescope, and indeed, for both color reproduction and pure black-and-white reproduction. Using the invention, parameters such as pincushion distortions, non-linearities and similar, can also be automatically eliminated during the manufacture of conventional television apparatus.

The lattice design with the strips 11, 12 which marks the individual crossing points 13 on the picture area 10, can also be formed by another type of pattern which marks certain picture elements on the picture area 10. For adjusting certain parameters, a cross grid or a pattern having exclusively vertical or horizontal lines can also be suitable. The rows of sensors 15, 16 with a multiplicity of individual sensors 17 can also be replaced by one single sensor, the output voltage of which is then evaluated.

We claim:

1. A method of correcting position errors of points in a television picture formed from a plurality of horizontal lines comprising the steps of:
    arranging a pattern of at least two perpendicular rows of photosensors in the proximity of said television picture, said rows being skewed with respect to said lines;
    sequentially illuminating said pattern of photosensors with said individual pictures;
    noting the positions of the most brilliantly illuminated sensors for each individual picture and generating correction values for each of said individual pictures in accordance with the position of said most brilliantly illuminated sensors within said pattern; and
    storing said correction values and using said correction values to correct the positions of points within said individual pictures.

2. The method of claim 1 wherein said horizontal lines trace different colored lines.

3. The method of claim 2 wherein said correction values correct the convergence of said individual pictures to provide a correctly converged television picture.

4. A system for correcting positional errors in a television display formed from a plurality of horizontal lines comprising:
    an array of sensors, including at least two perpendicular rows of sensors, said rows or sensors being skewed with respect to said lines, arranged in proximity to said television picture;
    means for activating said display to sequentially scan said array in a pattern of vertical and horizontal lines, and for determining which of the sensors, within said array, receive the most illumination;
    means responsive to said determining means for producing correction values in accordance with the locations of the sensors which receive the most illumination within said array;
    means for storing said correction values; and
    means for receiving said correction values and utilizing said correction values to correct said positional errors.

* * * * *